(12) United States Patent
Patton et al.

(10) Patent No.: US 8,014,006 B2
(45) Date of Patent: Sep. 6, 2011

(54) SYSTEM AND METHOD FOR DELIVERING NATIVE STRUCTURE DOCUMENT PRINTING INSTRUCTIONS

(75) Inventors: Ronnie Neil Patton, Lake Oswego, OR (US); Tanna Marie Richardson, Happy Valley, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 2055 days.

(21) Appl. No.: 10/454,112

(22) Filed: Jun. 3, 2003

(65) Prior Publication Data
US 2004/0246515 A1 Dec. 9, 2004

(51) Int. Cl.
G06F 3/12 (2006.01)
H04N 1/00 (2006.01)
G06F 15/16 (2006.01)
G06F 15/167 (2006.01)

(52) U.S. Cl. ...... 358/1.13; 358/1.15; 358/402; 709/208; 709/217

(58) Field of Classification Search .................. 358/1.13, 358/402, 1.15
See application file for complete search history.

(56) References Cited

U.S. PATENT DOCUMENTS

| | | | | |
|---|---|---|---|---|
| 5,130,818 A * | 7/1992 | Tadokoro | ...................... | 358/407 |
| 5,513,126 A * | 4/1996 | Harkins et al. | ................ | 709/228 |
| 5,668,640 A * | 9/1997 | Nozawa et al. | ................ | 358/434 |
| 6,389,456 B1 | 5/2002 | Okimoto | ........................ | 709/206 |
| 6,522,421 B2 * | 2/2003 | Chapman et al. | ............ | 358/1.15 |
| 6,938,202 B1 * | 8/2005 | Matsubayashi et al. | ...... | 715/234 |
| 7,072,059 B2 * | 7/2006 | Van Der Linden et al. | .. | 358/1.15 |
| 7,268,907 B2 * | 9/2007 | Sato | ............................. | 358/1.15 |
| 2001/0050781 A1 * | 12/2001 | Kujirai | ......................... | 358/1.15 |
| 2002/0097414 A1 * | 7/2002 | Utsunomiya | ................ | 358/1.13 |
| 2003/0025927 A1 * | 2/2003 | Hino et al. | .................... | 358/1.13 |
| 2003/0025934 A1 | 2/2003 | Takamiya | ..................... | 358/1.15 |
| 2003/0072031 A1 * | 4/2003 | Kuwata et al. | .............. | 358/1.15 |
| 2003/0174357 A1 * | 9/2003 | Lester et al. | ................. | 358/1.15 |

FOREIGN PATENT DOCUMENTS

| | | |
|---|---|---|
| JP | 2000242444 | 9/2000 |
| JP | 2001159962 | 6/2001 |
| JP | 2001217948 | 8/2001 |
| JP | 2002197029 | 7/2002 |
| JP | 2002236568 | 8/2002 |

* cited by examiner

*Primary Examiner* — David K Moore
*Assistant Examiner* — Hilina S Kassa
(74) *Attorney, Agent, or Firm* — Law Office of Gerald Maliszewski; Gerald Maliszewski

(57) ABSTRACT

A system and method are provided for delivering document print instructions in a system of network-connected devices. The method comprises: accepting printer control data at a network-connected email address; generating the printer-controller form in response to the printer control data; calling the printer-controller form; populating printer-controller form parameters; attaching a document to the printer-controller form; emailing the printer-controller form, with attachment, to a network-connected printer; and, printing the attached document in response to the printer-controller form parameters. Printing the attachment in response to the printer-controller form parameters includes the printer: opening the emailed printer-controller form; parsing the printer-controller form parameters; and, printing in response to the parsed parameters. In some aspects of the method, the printer-controller form is saved at a network-connected server, and calling a printer-controller form includes accessing the form from the server. Alternately, the printer-controller form is generated by the printer and delivered, via email.

30 Claims, 4 Drawing Sheets

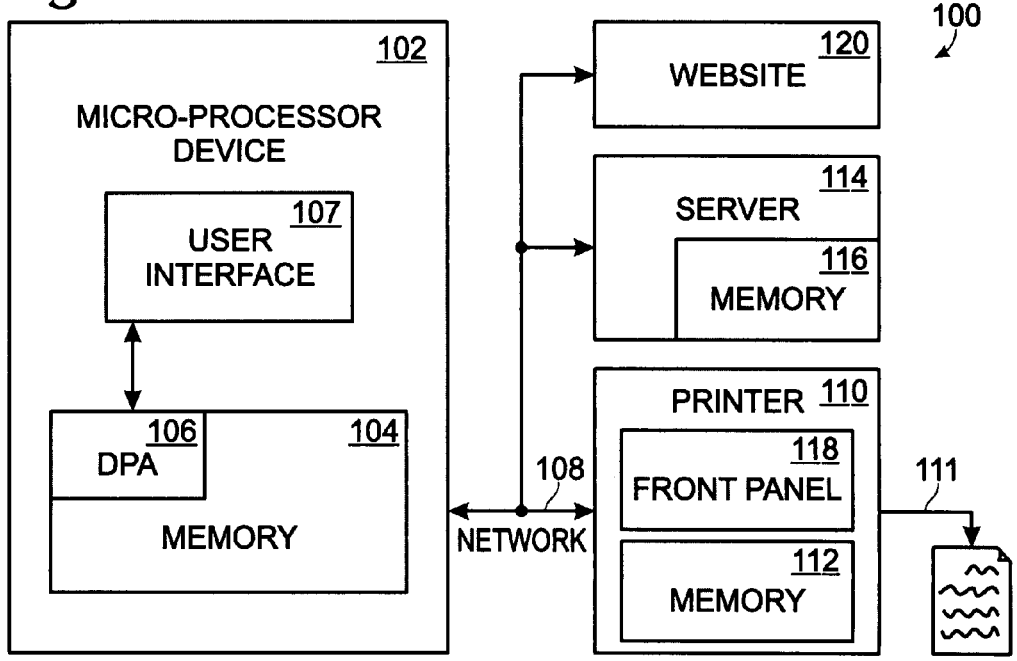
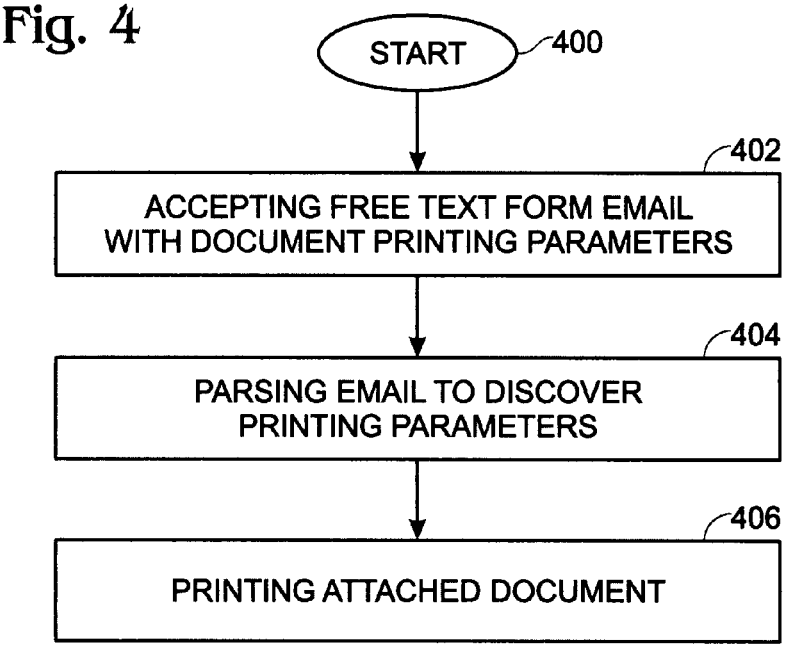

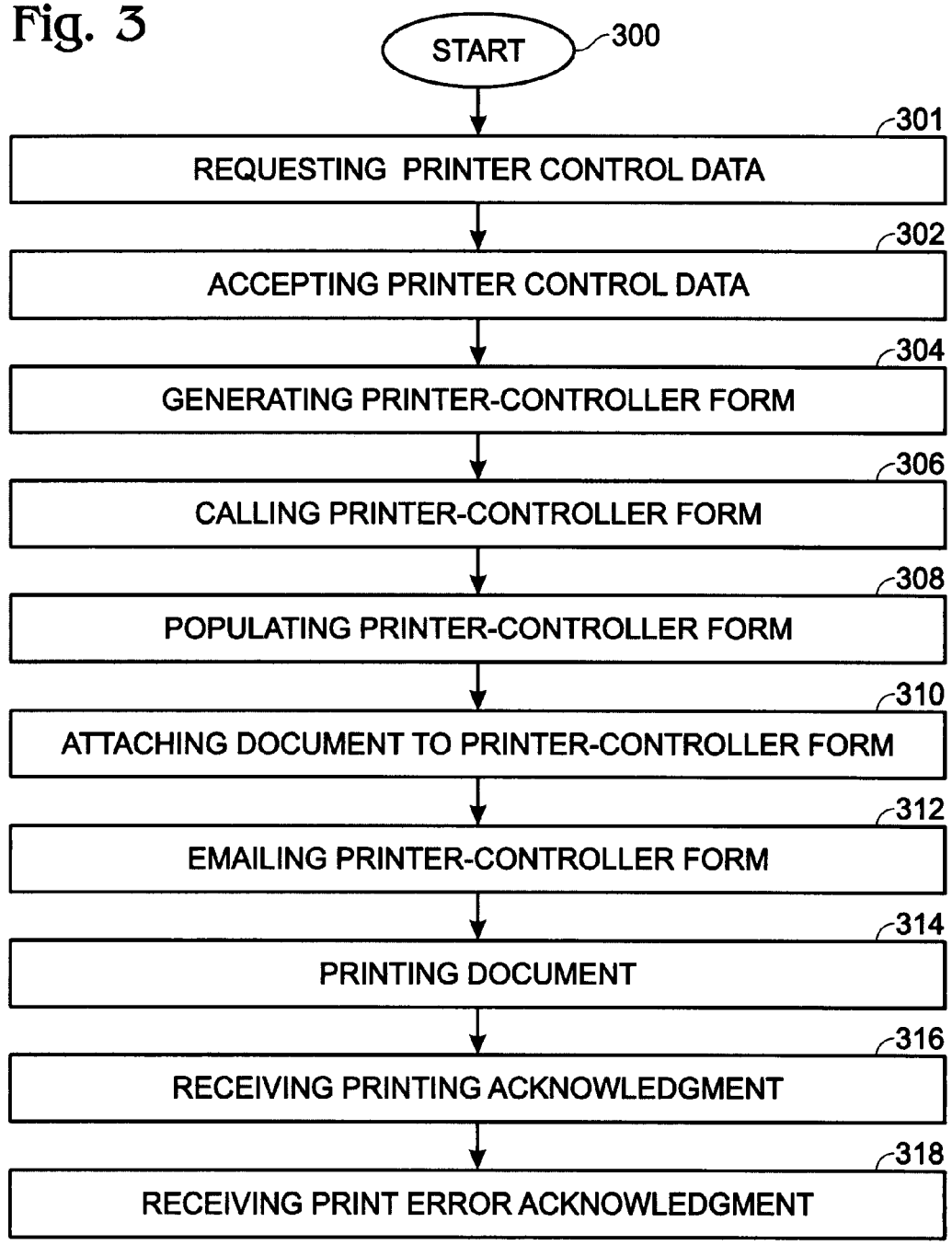

SYSTEM AND METHOD FOR DELIVERING NATIVE STRUCTURE DOCUMENT PRINTING INSTRUCTIONS

BACKGROUND OF THE INVENTION

1. Field of the Invention

This invention generally relates to digital document processing and, more particularly, to a system and method for emailing native structure documents to a printer with a printer-controller form.

2. Description of the Related Art

Many end-users of networked printers and multifunctional peripherals (MFPs) desire to improve the efficiency of their printing environment. One common way of improving efficiency involves the direct printing of computer files with native structures, similar to the native structure required by the output device. This technique improves printing efficiency by avoiding the intermediation of a software module known as an output device driver. An example of this approach is the direct printing of files in the TIFF (Tagged Image File Format) to output devices that can interpret, render, and print TIFF files directly, without the need for a driver. Another example is the direct printing of Page Description Format (PDF) files to output devices with PostScript interpreters. Since the PDF format is compatible with the PostScript format, no driver is needed for translation or interpretation to the printer's native PostScript format.

In a conventional process, it is very difficult for a user to change the default printing characteristics of the output device (printer). For example, the default characteristics of the output device may limit the user to one copy of a single-sided, unfinished document. A variety of information is required for end-users to connect and output to a device on a network, and to change its default printing characteristics. Unfortunately this information may not be readily available to end-users through to use of a print driver.

Conventional processes inadequately address this problem. End-users may rely on a separate printing application similar to a print driver that can control a few basic parameters, such as the number of output pages desired. These applications are typically "one size fits all" in nature, and cannot take advantage of unique output device capabilities. The ability to utilize unique device characteristics is typically reserved for a device-specific driver. However, using a driver does not improve the efficiency of the printing process, which would be the purpose of direct printing.

Email distribution systems exist that take information generated by a printing device and distribute it via email to users. However, this information is not geared to the process of directly printing print-ready files. Rather, the system merely distributes information that is already available, on paper or via the front panel, in an alternative format (email). A return path is not provided in which the distributed information can be utilized to control the behavior of the output device.

Other systems utilize information from a computer's driver registry to determine device output characteristics. Once again, however, the goal of directly printing print-ready files is not addressed. The print path supported by these systems is the same as the normal device driver print path.

So-called direct printing utilities exist that reside on a user's PC or workstation. The utility can send print-ready files to an output device, and control print job characteristics and printer parameters. However, these utilities do not access device information or use email to submit print jobs. Further, the utilities provide access to limited set of device functionality.

It would be advantageous if the printing of documents could be more directly and efficiently controlled by eliminating the conventional print driver.

It would be advantageous if the document printing process could be controlled to take advantage of the characteristics of the particular printer.

It would be advantageous if the document printing process could be controlled using a conventional email application.

SUMMARY OF THE INVENTION

The present invention provides a novel solution to the above-mentioned problem. A mechanism is described that utilizes an email system to discover printing attributes of an output device, select attribute values that control the output of individual print jobs, submit the print job to the output device, and control the output device's operation for the submitted jobs.

Accordingly, a method is provided for delivering document print instructions in a system of network-connected devices. The method comprises: accepting printer control data at a network-connected email address; generating the printer-controller form in response to the printer control data; calling the printer-controller form; populating printer-controller form parameters; attaching a document to the printer-controller form; emailing the printer-controller form, with attachment, to a network-connected printer; and, printing the attached document in response to the printer-controller form parameters.

More specifically, attaching a document to the printer-controller form typically includes attaching a native structure document to the printer-controller form, and printing the attachment in response to the printer-controller form parameters includes printing the native structure document. Printing the attachment in response to the printer-controller form parameters includes the printer: opening the emailed printer-controller form; parsing the printer-controller form parameters; and, printing in response to the parsed parameters.

In some aspects of the method, the printer-controller form is saved at a network-connected server, and calling a printer-controller form includes accessing the form from the server. Alternately, the printer-controller form can be accessed from a website associated with the printer. In other aspects, the printer-controller form is generated on the printer-side and delivered, via email, to a computer in which form attachment application is embedded.

Additional details of the above-described method and a system for the delivery of document print instructions in a network of connected devices are provided below.

BRIEF DESCRIPTION OF THE DRAWINGS

FIG. 1 is a schematic block diagram of the present invention system for the delivery of document print instructions in a network of connected devices.

FIG. 3 is a flowchart illustrating the present invention method for delivering document print instructions in a system of network-connected devices.

FIG. 4 is a flowchart illustrating the present invention method for accepting document print instructions in a system of network-connected devices.

DETAILED DESCRIPTION OF THE PREFERRED EMBODIMENTS

Figure 2:
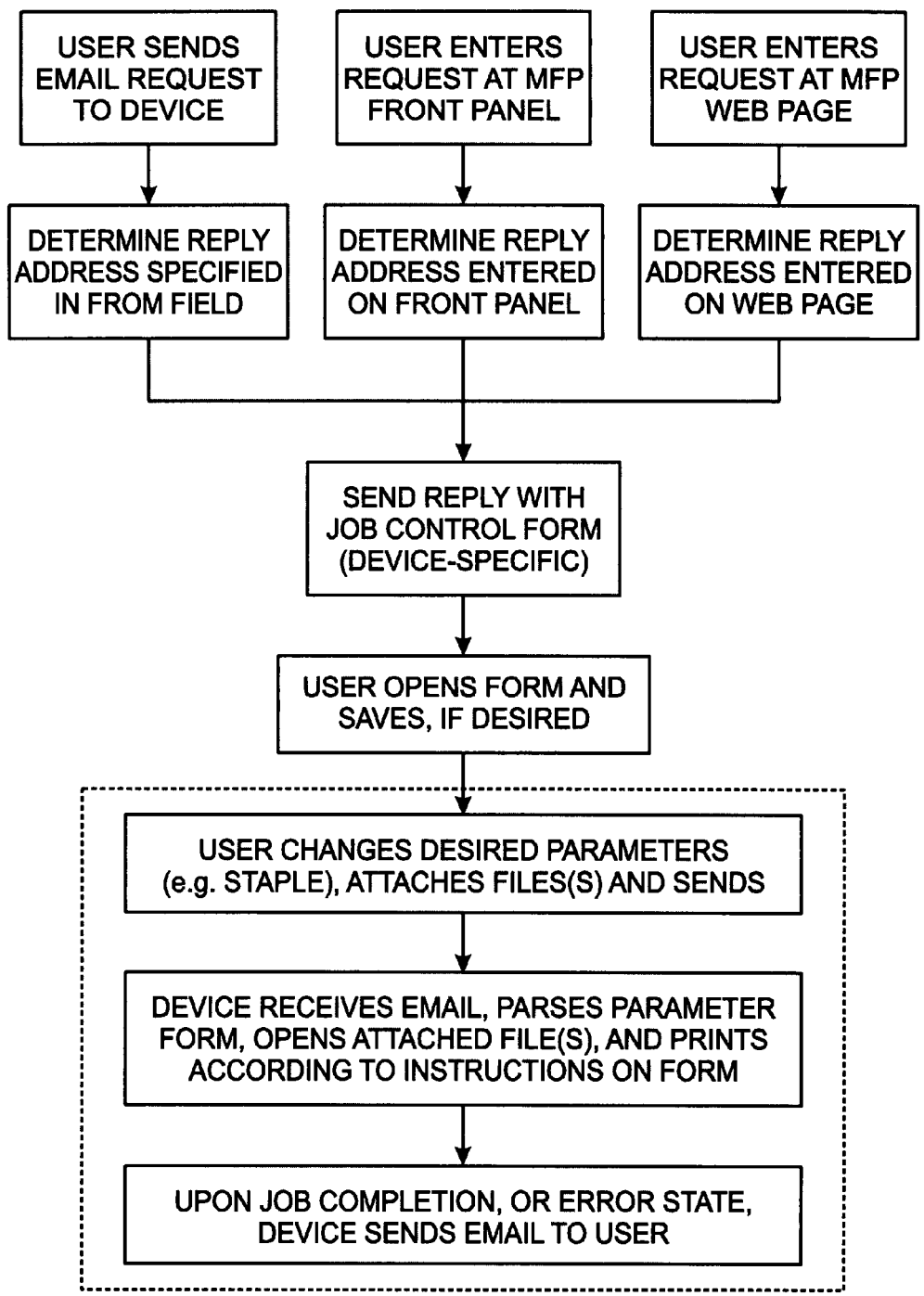
FIG. 2 is a diagram illustrating some present invention user options.

FIG. 1 is a schematic block diagram of the present invention system for the delivery of document print instructions in a network of connected devices. The system 100 comprises a micro-processor device 102 including a memory 104 with a direct printing application 106 (DPA). The direct printing application calls a printer-controller form. The direct printing application 106 also populates printer-controller form parameters and attaches a document to the printer-controller form. In some aspects, the DPA 106 connects with a user interface 107 to accept form population commands. The micro-processor device 102 has a port connected to a network 108 for emailing the printer-controller form, with the attachment. The micro-processor device 102 can be a personal digital assistant (PDA) or a personal computer (PC), to name a couple of examples.

The direct printing application may a dedicated software application created solely for the direct printing function. Alternately, existing software applications such as Outlook, or the equivalent, may be used. Such applications have "forms" capabilities that are conventionally used to generate email forms, contact forms, meeting forms, and the like. This capability can be used to generate a printer-controller form. Neither is the invention limited to any kind of network or network protocol. The network can be local or wide area network, and may communicate via wired, wireless, and/or optical media.

A printer 110 has a port connected to the network 108 for accepting the printer-controller form email from the microprocessor device 102, and an output 111 to supply a printed document. The printer 110 prints the attached document in response to the printer-controller form parameters. That is, the printer 110 opens the emailed printer-controller form, parses the printer-controller form parameters, and prints in response to the parsed parameters. The printer 110 can be any digital document-generating device such as a copier, scanner, fax device, or multi-functional peripheral (MFP). Some common print instructions that may be parsed and acted upon include the selection of paper size, the number of copies, single/double side printing, and the format of the attached native document, to name but a few examples. Although only a single printer is shown, it should be understood the microprocessor device 102 may be connected to a plurality of printer, each with unique printing characteristics. Likewise, printer 110 may be connected to a plurality of micro-processor devices (not shown).

The micro-processor device direct printing application 106 has the ability to attach a native structure document to the printer-controller form, and the printer 110 prints the native structure document. For example, the native structure document may be a Word, WordPerfect, or PDF file to name but a few examples.

In one aspect of the system 100, the printer 110 includes a memory 112 with printer control data. The printer 110 supplies the printer control data at the network-connected port on line 108. The micro-processor direct printing application 106 generates the printer-controller form in response to the printer control data accepted from the printer 110. In one aspect, the printer 110 supplies a predetermined printer-controller form from memory 112. The micro-processor direct printing application 106 saves the printer-controller form in local memory, such as memory 104, and calls the printer-controller form from local memory 104 whenever needed.

In other aspects, the system 100 further comprises a server 114 having a memory 116 and a port connected to the network 108. In this aspect the micro-processor direct printing application 106 saves the printer-controller form in the server memory 116 and calls the printer-controller form from the server memory 116 whenever needed.

In one aspect, the micro-processor direct printing application 106 emails a request to the printer 110 for the printer control data, and the printer 110 sends the printer control data to a network-connected email address specified in the request. Alternately, the printer 110 includes a front panel 118 to accept a user request for the printer control data. The printer 110 sends the printer control data to a network-connected email address specified in the request delivered via the front panel 118.

In another aspect, the system 100 further comprises a website 120 associated with the printer having a port on line 108, or another network (not shown), for accepting requests for printer control data. As above, the website 120 sends the printer control data to a network-connected email address specified in the request.

One advantage of the present invention system 100 is the ability to direct the same print instructions to a plurality of documents, instead of having to generate the same set of instructions individually for each document. That is, the micro-processor direct printing application 106 may attach the plurality of documents to the printer-controller form. Then, the printer 110 prints the plurality of attached documents in response to the printer-controller form parameters. For example, the form may specify that 4 double-sided copies be printed of each document.

In some aspects, the printer 110 sends an email to the micro-processor direct printing application 106 acknowledging the completion of the printing task. In other aspects, the printer 110 sends an email to the micro-processor direct printing application 106 acknowledging a printing error, if a printing error does occur.

Functional Description

The present invention permits a user to retrieve all information and tools for configuration and usage by accessing only an email system, such as a local network email system. It differs from conventional systems in three fundamentally different ways:

(1) An email system provides the mechanism for device discovery and control and communicates this information to an end user;

(2) The system provides a mechanism for directly transmitting and printing "print-ready" files to an output device (printer) without the use of an intermediary program such as a device driver or print spooler; and, (3) The invention utilizes a standard email forms feature to describe and select output device attributes.

The present invention uniquely provides a method, based upon email for accessing information directly from the output device and utilizing that information in a job stream, to control the output device in a job-specific manner.

In one aspect, the invention utilizes an output device, such as an MFP or a printer, connected to a local area network with access to email services. In addition, the output device has a local memory system (RAM or hard disk). The local memory system contains all the data and files necessary to control the output device. This data may be in the form of an email template.

The data contained on the local memory system for device discovery and control includes items that are normally found on output device drivers. This would typically include (1) number of copies, (2) two sided printing (Y/N), (3) Finishing options (e.g., stapling, binding, etc.), (4) Format of the input file (TIFF, PS, PCL, PDF, etc.), and many other device-specific parameters. Data required for direct printing, such as configuration information, may be supplied by the device or may require administrator input, for example a form input. Likewise, files may be pre-installed on the device or downloaded by the system administrator.

The output device printer is connected to an email system and has a unique device email address. The email system can be accessed from the user's workstation or PC.

FIG. 2 is a diagram illustrating some present invention user options. The options are as follows:

(1) A user sends a message to an output device requesting output services;
  a. The message may be an email from the user to the output device;
  b. The message may be a user request entered at the output device's front panel; or,
  c. The message may be a user request entered from a workstation on the output device's internal web page.

(2) The output device responds to request and sends an email to specified location;
  a. If the original request came via email system, the output device replies to location specified in "FROM:" field;
  b. If the original request came via the output device's front panel, the output device requests that the user's email address be input or selected at the front panel. the device responds to that email address; or,
  c. If the original message came via an internal web page, the output device requests that the user's email address be input on the web page. The device responds to that email address.

(3) The output device response consists of:
  a. an email to the user's email address; and,
  b. a Parameter (printer-controller) Form or template containing device-specific parameters requested for job control.

(4) The user opens the device's email and the attached form. The user may change default values for specific job. Only parameter values may be changed, not parameter names or field locations. The user may save the Parameter Form for subsequent re-use.

(5) The user sends an email to output device, using the Parameter (printer-controller) Form, and attaching files to be printed to the email.

(6) The output device receives the email from user, parses the Parameter Form for job configuration directions, opens each attached print file, and prints each file according to instructions provided in Parameter form.

(7) When job is completed by output device, or if there is a problem with job completion, the output device notifies the user via email.

In one aspect, all resource files, templates, and information can be stored locally on the device. Alternatively, these resources can be stored on the network, provided that the user knows where this information is located. The user interaction would be the similar regardless of the aspect selected.

In another aspect, the output device parses the body of the email message, looking for key words or parameter names, such as those specified on the Parameter Form. This aspect requires a reasonably sophisticated key word search capability for the output device, since the email message can be a free text format.

FIG. 3 is a flowchart illustrating the present invention method for delivering document print instructions in a system of network-connected devices. Although the method (and the methods described below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300.

Step 302 accepts printer control data. Step 304 generates a printer-controller form in response to the printer control data. Step 306 calls the printer-controller form. Step 308 populates printer-controller form parameters. Step 310 attaches a document to the printer-controller form. Step 312 emails the printer-controller form, with attachment, to a network-connected printer. In one aspect Step 312 emails via a wireless communications medium, however, the method is not limited to any particular medium. Step 314 prints the attached document in response to the printer-controller form parameters.

In some aspects of the method, attaching a document to the printer-controller form in Step 310 includes attaching a native structure document to the printer-controller form. Then, printing the attachment in response to the printer-controller form parameters in Step 314 includes printing the native structure document.

In some aspects, accepting printer control data (Step 302) and generating the printer-controller form in response to the printer control data (Step 304) includes accepting a predetermined printer-controller form from the printer. Then, the method may comprise a further step, Step 305 (not shown), of saving the printer-controller form in memory. In some aspects, the form is saved in local memory. Alternately, saving the printer-controller form in memory includes saving the printer-controller form at a network-connected server. Then, calling the printer-controller form in Step 306 includes accessing the form from the server.

In some aspects, printing the attachment in response to the printer-controller form parameters (Step 314) includes the printer: opening the emailed printer-controller form; parsing the printer-controller form parameters; and, printing in response to the parsed parameters.

In one aspect a further step, Step 301, emails a request to the printer for the printer control data. Then, accepting printer control data in Step 302 includes receiving the printer control data at a network-connected email address specified in the request. Alternately, Step 301 submits a user request for the printer control data at a front panel of the printer. In another alternative, Step 301 accesses a network-connected website associated with the printer.

In one aspect, attaching a document to the printer-controller form in Step 310 includes attaching a plurality of documents to the printer-controller form. Then, printing the attachment in response to the printer-controller form parameters in Step 314 includes printing the plurality of attached documents in response to the parameters.

In other aspects the method includes additional steps. Step 316, following the printing of the document, accepts an email from the printer, acknowledging the completion of the printing task. Step 318, in the event of a printing error, accepts an email from the printer, acknowledging the printing error.

FIG. 4 is a flowchart illustrating the present invention method for accepting document print instructions in a system of network-connected devices. The method starts at Step 400. Step 402 accepts a free text form email, including document printing parameters, with an attached native structure document. Step 404 parses the email to discover printing parameters. Step 406 prints the attached document in response to the discovered parameters.

Figure 5:
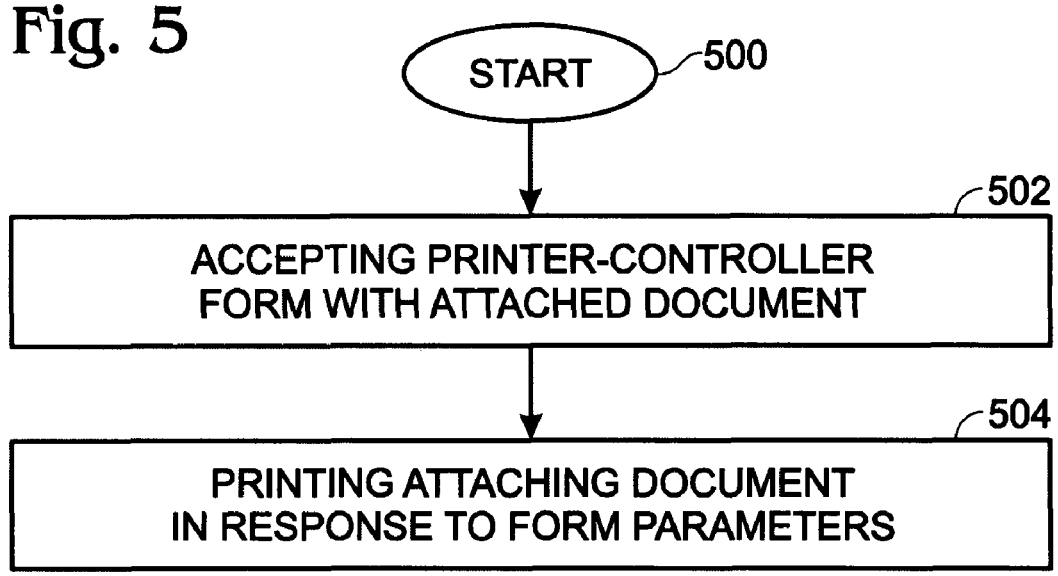
FIG. 5 is a flowchart illustrating a variation of the present invention method for accepting document print instructions in a system of network-connected devices.

FIG. 5 is a flowchart illustrating a variation of the present invention method for accepting document print instructions in a system of network-connected devices. The method starts at Step 500. Step 502 accepts an emailed printer-controller form with an attached document. Step 504 prints the attached document in response to populated parameters of the printer-controller form.

A system and method for communicating direct document print instructions has been provided. Examples have been given to help illustrate details and uses of the invention. However, the invention is not limited to merely these examples. Other variations and embodiments of the invention will occur to those skilled in the art.

We claim:

1. In a system of network-connected devices, a method for delivering document print instructions to a printer, the method comprising:
   requesting a first printer-controller form;
   accepting a first email with an attached first printer-controller form, which is a template of first printer-specific document printing parameter fields associated exclusively with a network-connected first printer;
   populating printer-controller form parameters;
   attaching a document and the first printer-controller form to a second email;
   sending the second email, with attachments, to the first printer without the use of an intermediary program selected from a group consisting of a printer driver and a print spooler; and,
   printing the attached document at the first printer in response to the printer-controller form parameters.

2. The method of claim 1 wherein attaching a document to the second email includes attaching a native structure document to the second email; and,
   wherein printing the attachment in response to the printer-controller form parameters includes printing the native structure document.

3. The method of claim 1 wherein accepting the first printer-controller form includes accepting the first printer-controller form from the first printer.

4. The method of claim 3 further comprising:
   saving the first printer-controller form in memory.

5. The method of claim 4 wherein saving the first printer-controller form in memory includes saving the first printer-controller form at a network-connected server; and,
   wherein accepting the first printer-controller form includes receiving the form in the first email from the server.

6. The method of claim 1 wherein printing the attachment in response to the printer-controller form parameters includes the first printer:
   opening the emailed printer-controller form;
   parsing the printer-controller form parameters; and,
   printing in response to the parsed parameters.

7. The method of claim 1 wherein requesting the first printer-controller form includes emailing a request to the first printer for the first printer-controller form; and,
   wherein accepting the first email with the first printer-controller form includes receiving the first email at a network-connected email address specified in the request.

8. The method of claim 1 wherein requesting the first printer-controller form includes, at a front panel of the first printer, submitting a user request for the first printer-controller form; and,
   wherein accepting the first email with the first printer-controller form includes receiving the first email at a network-connected email address specified in the request.

9. The method of claim 1 wherein requesting the first printer-controller form includes accessing a network-connected website associated with the first printer; and,
   wherein accepting the first email with the first printer-controller form includes receiving the first email at a network-connected email address specified in the request.

10. The method of claim 1 wherein attaching the document and the printer-controller form to the second email includes attaching a plurality of documents to the email; and,
    wherein printing the attachment in response to the printer-controller form parameters includes printing the plurality of attached documents in response to the parameters.

11. The method of claim 1 further comprising:
    following the printing of the document, accepting a third email from the first printer, acknowledging the completion of the printing task.

12. The method of claim 1 further comprising:
    in the event of a printing error, accepting a third email from the first printer, acknowledging the printing error.

13. The method of claim 1 wherein sending the second email to the network-connected first printer includes sending the email via a wireless communications medium.

14. In a system of network-connected devices, a method for a first printer to accept document print instructions, the method comprising:
    sending a first printer-controller form to a network-connected device, the first printer-controller form being a template of first printer-specific document printing parameter fields associated exclusively with a first printer;
    at the first printer, accepting an email with an attached populated first printer-controller form and an attached document;
    parsing parameters in the printer-controller form; and,
    printing the attached document in response to populated parameters of the printer-controller form.

15. A system for the delivery of document print instructions in a network of connected devices, the system comprising:
    a micro-processor device with a direct printing application stored in a memory, the micro-processor device requesting a first printer-controller form template of first printer-specific document printing parameter fields associated exclusively with a first printer, and populating printer-controller form parameters, the micro-processor device having a port connected to a network for accepting the first printer-controller form, and for sending the first printer-controller form with populated parameters and a document as attachments to an email without the use of an intermediary program selected from a group consisting of a printer driver and a print spooler; and,
    a first printer having a port connected to the network for accepting the email from the micro-processor device and printing the attached document in response to the attached printer-controller form parameters.

16. The system of claim 15 wherein the micro-processor device direct printing application attaches a native structure document to the email; and,
    wherein the first printer prints the native structure document.

17. The system of claim 15 wherein the first printer supplies the first printer-controller form from memory.

18. The system of claim 17 wherein the micro-processor direct printing application saves the first printer-controller form in local memory and calls the first printer-controller form from local memory.

19. The system of claim 17 further comprising:
a server having a memory and a port connected to the network; and,
wherein the micro-processor direct printing application saves the first printer-controller form in the server memory and calls the first printer-controller form from the server memory.

20. The system of claim 15 wherein the first printer opens the attached printer-controller form, parses the printer-controller form parameters, and prints the attached document in response to the parsed parameters.

21. The system of claim 15 wherein the micro-processor direct printing application emails a request to the first printer for the first printer controller form; and,
wherein the first printer sends the first printer-controller form to a network-connected email address specified in the request.

22. The system of claim 15 wherein the first printer includes a front panel to accept a user request for the printer control data, and wherein the first printer sends the first printer-controller form to a network-connected email address specified in the request.

23. The system of claim 15 further comprising:
a website associated with the first printer having a port for accepting requests for the first printer controller form and for sending the first printer-controller form to a network-connected email address specified in the request.

24. The system of claim 15 wherein the micro-processor direct printing application attaches a plurality of documents to the email; and,
wherein the first printer prints the plurality of attached documents in response to the attached printer-controller form parameters.

25. The system of claim 15 wherein the first printer sends an email to the micro-processor direct printing application acknowledging the completion of the printing task.

26. The system of claim 15 wherein the first printer, in the event of a printing error, sends an email to the micro-processor direct printing application acknowledging the printing error.

27. The system of claim 15 wherein the micro-processor device is a device selected from the group including personal digital assistants (PDAs) and personal computers (PCs).

28. The system of claim 15 wherein the first printer is a device selected from the group including copiers, scanners, fax devices, and multi-functional peripherals (MFPs).

29. The system of claim 15 wherein the first printer receives the email via a wireless communications network.

30. In a system of network-connected devices, a method for a printer to accept document print instructions, the method comprising:
sending a first printer-controller form to a network-connected device, the printer-controller form being a template of first printer-specific document printing parameters fields associated exclusively with a first network-connected printer;
at the first printer, accepting an email, with an attached populated first printer-controller form and with an attached native structure document from the network-connected device, without the use of an intermediary program selected from a group consisting of a printer driver and a print spooler;
parsing the printer-controller form to discover printing parameters; and,
printing the attached document in response to the discovered parameters.

* * * * *